J. H. CLARK.
HEADLIGHT FOR MOTOR VEHICLES.
APPLICATION FILED AUG. 21, 1913.
1,144,813.
Patented June 29, 1915.
3 SHEETS—SHEET 1.
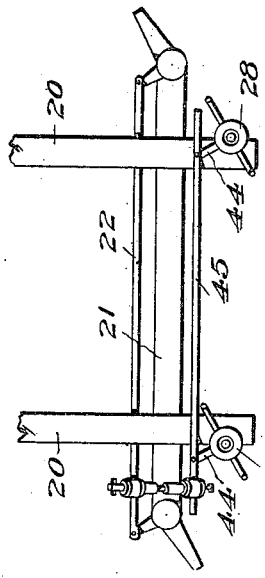
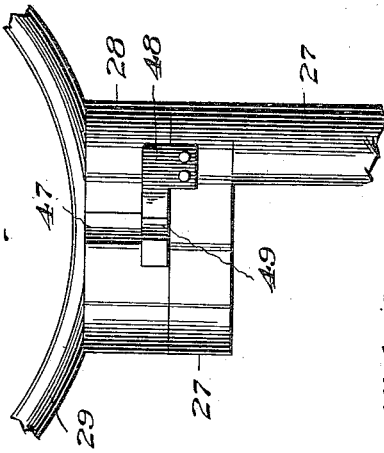
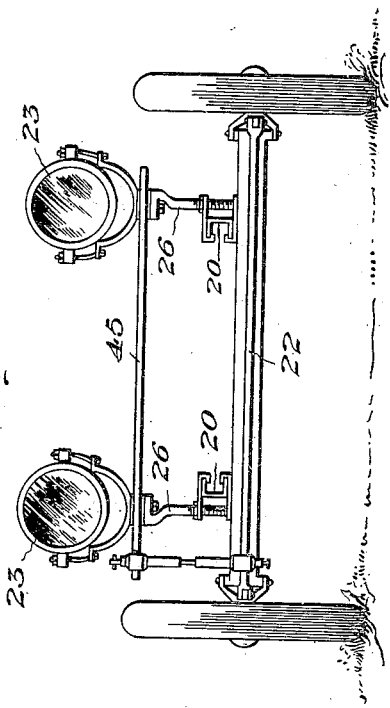
Witnesses
Inventor
James H. Clark
By Edson Bros.
Attorneys

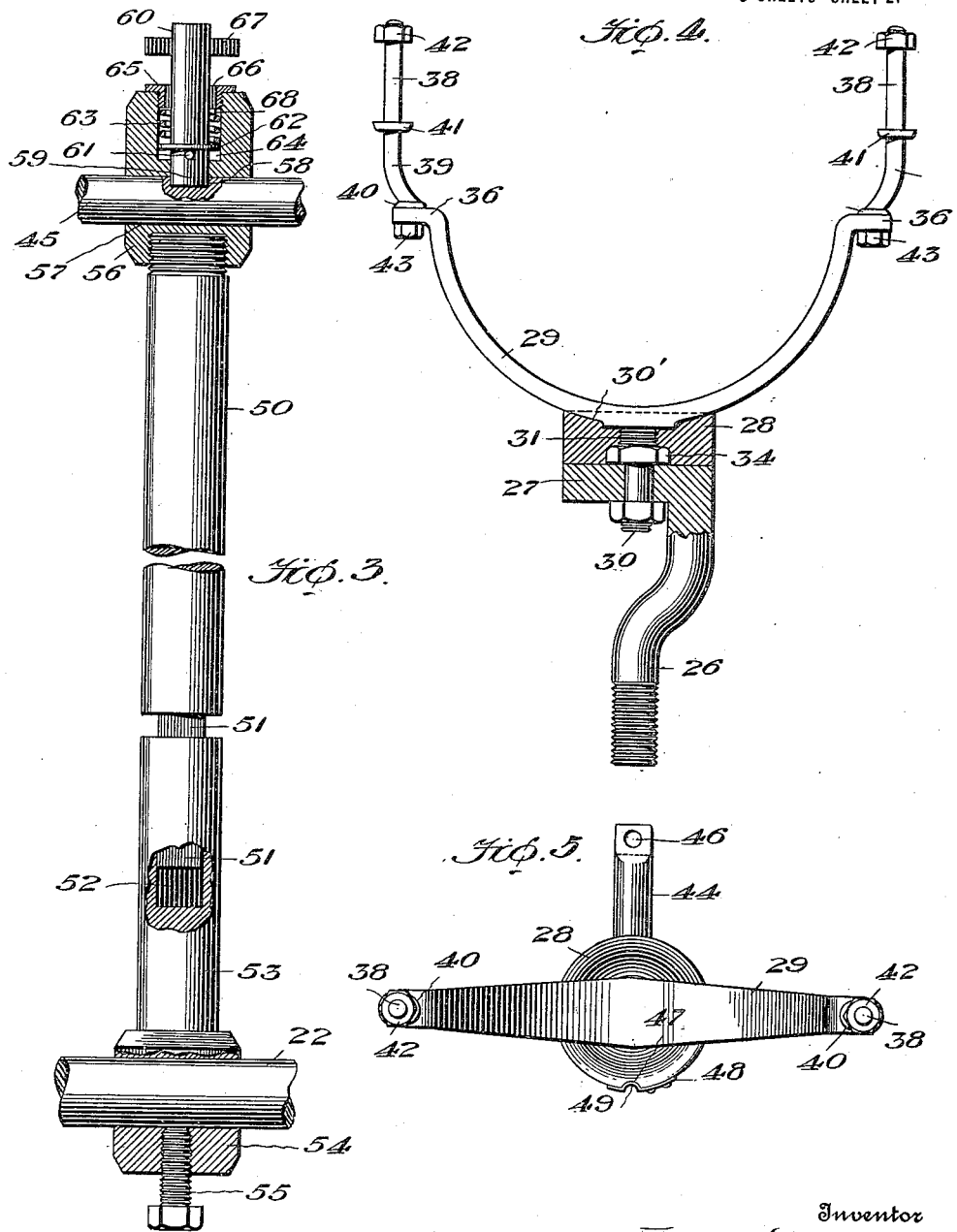

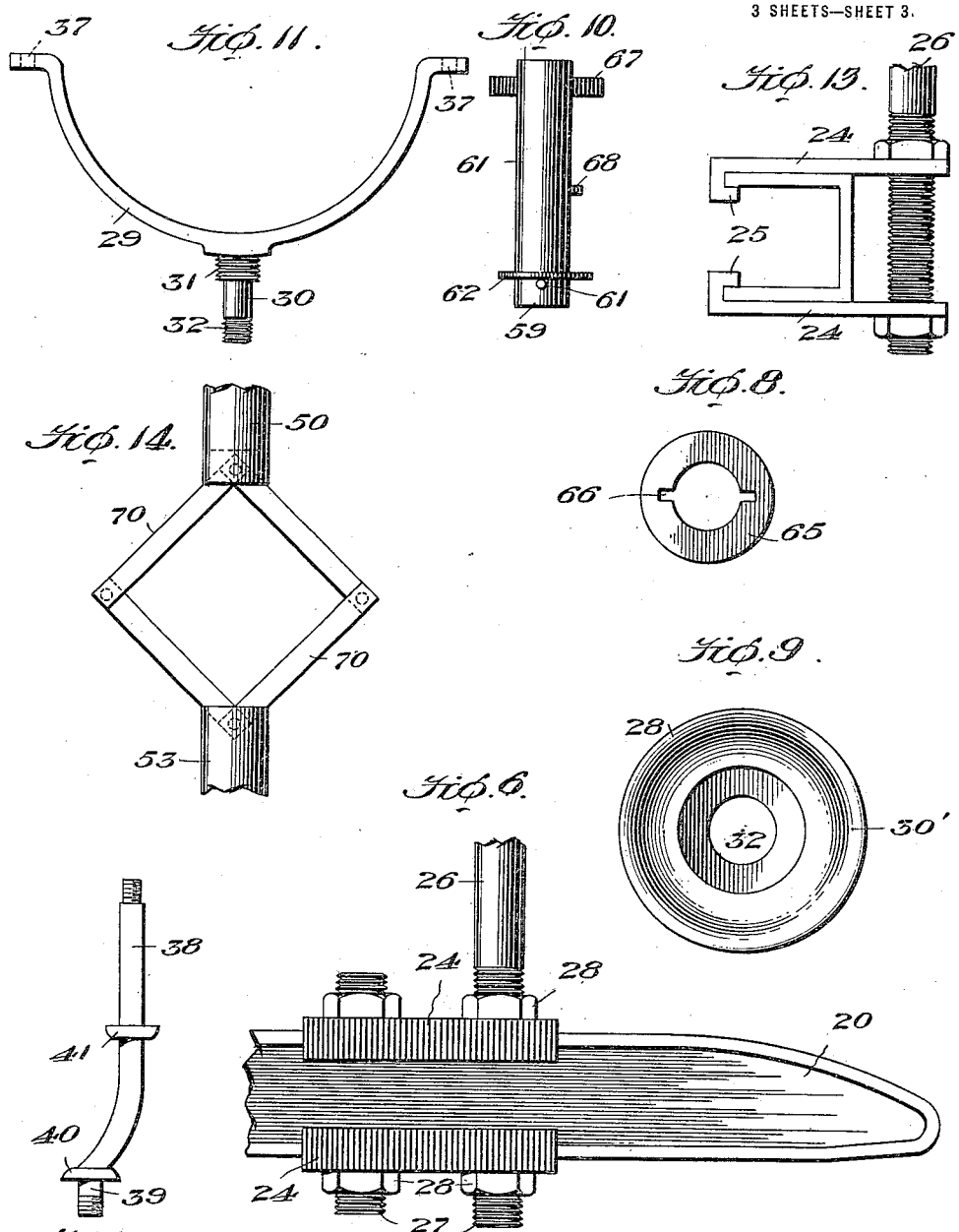

UNITED STATES PATENT OFFICE.

JAMES H. CLARK, OF ST. JOHNS, OREGON, ASSIGNOR, BY DIRECT AND MESNE ASSIGNMENTS, OF TWO-THIRDS TO JESSE M. RUSSELL, OF ST. JOHNS, OREGON.

HEADLIGHT FOR MOTOR-VEHICLES.

1,144,813.      Specification of Letters Patent.      Patented June 29, 1915.

Application filed August 21, 1913. Serial No. 785,969.

*To all whom it may concern:*

Be it known that I, JAMES H. CLARK, a citizen of the United States, residing at St. Johns, in the county of Multnomah and State of Oregon, have invented certain new and useful Improvements in Headlights for Motor-Vehicles; and I do hereby declare the following to be a full, clear, and exact description of the invention, such as will enable others skilled in the art to which it appertains to make and use the same.

This invention is a headlight adapted more particularly for use on automobiles and having for its main object to provide means of simple construction which will automatically direct the light projecting from the lamps carried by the vehicle in front of the wheels, especially in turning curves or corners.

A further purpose of the invention is to provide comparatively simple and efficient headlight operating devices which can be applied to vehicles of the ordinary type, and which will permit of the disconnection of the lamp-operating device when the lamps are not in use, such as in the daytime.

The invention is designed for attachment to motor vehicles of various types and is provided with means for accommodating headlights or lamps of various sizes, the lamps being retained in a predetermined position when the lamp-operating mechanism is disengaged from the steering mechanism of the machine.

The invention comprises removable lamp brackets adjustably mounted upon the frame of the vehicle, said brackets having arms which may be positioned to accommodate lamps of various sizes and provided with means to retain the lamps in a predetermined position when not actuated by the headlight moving mechanism. Means, such as a compensating rod, are provided, also, to maintain the parts in operative position, irrespective of the vibration or movement of the vehicle frame with relation to its running gear. Simple and inexpensive means are provided whereby the compensating rod may be quickly disengaged from the headlight connecting rod, thereby permitting the headlights to remain in a set position instead of following the direction of the wheels when the light is not required.

The invention consists, also, in the features of construction and the combination and arrangement of parts hereinafter described, and specified in the appended claims.

In the accompanying drawings:—Figure 1 is a front elevation of a part of an automobile provided with a headlight shifting mechanism. Fig. 2 is a plan view of the device, the lamps being removed from their vases and illustrating the lamp connecting rod mounted rearwardly of the lamp pivots. Fig. 3 is a detail view of the vertical compensating rod, partly in section. Fig. 4 is a front elevation of the lamp bracket, partly in section. Fig. 5 is a plan view of the lamp bracket. Fig. 6 is a detail view of the means of securing the lamp bracket to the frame. Fig. 7 is a detail view of the headlight retaining means. Fig. 8 is a plan view of a threaded bushing. Fig. 9 is a plan view of the upper disk member of the lamp bracket. Fig. 10 is a detail view of the plunger having the washer placed thereon which coöperates with the lamp connecting rod and compensating rod. Fig. 11 is a detail view of the curved extended arm of the lamp bracket, showing the depending spindle. Fig. 12 is a detail view of one of the extension adjustable arms which coöperates with the bracket member, shown in Fig. 11 for holding a lamp. Fig. 13 is an end view of the clamping devices disclosed in Fig. 6. Fig. 14 is a detail view of a modified form of the vertical compensating rod. Fig. 15 is a perspective view of the spring engaging the movable member of the lamp bracket.

In the embodiment of the invention illustrated in the accompanying drawings, the longitudinal members of the frame of an automobile are indicated at 20, the forward axle of the frame being indicated at 21. The steering wheels of the vehicle are connected in the usual manner by a reach rod, indicated at 22.

The lamps or headlights 23 are positioned upon a bracket which is rigidly secured to a suitable part of the frame of the vehicle. One means of securing the lamp to the frame 20 is shown in Figs. 6 and 13, comprising clamping arms 24 having retaining flanges 25, said arms being adapted to be brought into clamping engagement with a part of the frame, such as 20, to rigidly secure the lamp standard 26 in position on the frame. The lower end of the standard 26 is preferably threaded at 27 and adapted to be engaged by suitable nuts 28 which serve not only to clamp the members 24 to the frame 20, but to hold the standard 26 rigidly in position. The loosening of the nuts 28 permits the slidable adjustment of the plates 24 on frame 20, and the consequent changing of position of the standard 26 with relation to the body of the vehicle.

The upper end of the standard 26 is provided with a bearing surface 27, shown at substantially right angles to the main portion of the member 26. Positioned on the bearing surface is a movable member 28 adapted to support a suitable member 29 for holding the lamp. This member 29 is shown as provided with arcuate arms and with a depending stem 30, said stem being shown in Fig. 11 as of different diameter, the upper portion being of greater diameter than the lower portion of said stem. The stem 30 of the member 29 is adapted to be passed through a suitable aperture 32 in the upper movable member 28 of the bracket and also through a suitable aperture formed in member 27. The upper face of the movable member 28 is preferably concaved, as shown at 30' in Fig. 9, to afford suitable means for permitting the turning and adjustment of the member 29 with reference to member 28. To secure the stem 30 of member 29 to the member 28, there is provided a nut, indicated at 34, which is adapted to engage the enlarged portion 31 of said stem for clamping the member 29 to the member 28. A portion of the stem 30 is not threaded, and this portion serves as a bearing to contact with the aperture in member 27, which permits of the rotation of members 28 and 29 with reference to the standard 26. If desired, the stem 30 may be secured to member 26 by any suitable means.

To permit of the accommodation of lamps of various sizes to the bracket, the member 29 is provided at its upper ends with fingers 36 having apertures 37 formed therein. A suitable lamp-engaging rod 38 is mounted upon each of said fingers 36, each of said rods being provided with a depending stem 39, and a shoulder 40 whereby said rod 38 may be mounted upon the fingers 36 of the member 29. If desired, the rod may be provided also with a shoulder 41 which coöperates with a nut 42 to retain the lamp in position on the rod. It is preferred to curve the lower end of this rod 38, as shown in Fig. 4, the stem portion 39 of said rod being out of vertical alinement with the upper end 42. This arrangement of the lamp-engaging rods permits of their adjustability with reference to the member 29 whereby lamps of various widths may be accommodated by the bracket, such rods being locked in their adjusted position by a suitable nut shown at 43.

In Fig. 1, I have shown the reach rod and the wheel connecting rod 22 positioned in front of the axle 21, while in Fig. 2, this rod 22 is positioned in rear of said axle 21. The lamp-shifting device is adapted for adjustment to either forms of each rod, as will be readily understood from the drawings. Connected to the movable member 28 of the lamp bracket is a suitable arm 44, the outer end of which is provided with means to engage the lamp connecting rod 45. This arm may be bifurcated to inclose the rod, if desired, and may be provided with any suitable securing means through its perforation 46.

When the vehicle is moving in its straight forward position, or when it is desired to have the lamps maintained in a fixed position, such as when disconnected in the daytime, there is provided suitable means for holding the lamps against rotation. In the drawings, the movable member 28 is shown provided with a vertical groove 47, while the member 27 is provided with a resilient retaining device 48 having a retaining lip 49, shown arcuate in cross section, to engage the vertical slot 47 of member 28. When the lamps are brought to their forward or normal position, the retaining lip 49 will engage the slot 47 and hold the lamp against movement except when the arm 44 is moved with sufficient force to disengage the lip from said groove for the purpose of directing the light from the lamps in the same direction as that traveled by the steering wheels.

The transverse movement of the reach rod 22 is transmitted to the lamp-connecting rod 45 by means of a vertical compensating rod 50, shown in the drawings as provided with a reduced stem 51 having polygonal sides adapted to engage a polygonal opening 52 in a lower section 53 of said compensating rod. This lower section 53 is provided with a suitable head 54 and with an adjusting screw 55 whereby the head 54 may be retained into rigid engagement with the reach rod 22. The upper end of the compensating rod 50 is provided with a casing 56, suitably secured thereto, said casing being shown provided with a suitable transverse aperture 57 for the passage of the lamp connecting rod 45 therethrough. This connecting rod is preferably provided with suitable notch indicated at 58 for the reception of the end 59 of a retaining plunger member 60. The plunger 60 of the head 56 forms a catch device whereby the lamp-connecting rod 45 may be moved in unison with the movement of the reach rod 22, or may be entirely disconnected therefrom, when the lamps are not in use, thereby saving wear and tear upon the parts. The lower end of the plunger 60 is preferably provided with a stop pin 61 against which is seated a collar 62 serving as a bearing surface for a spring 63 seated in the vertical aperture 64 of the head. The upper end of said aperture 64 is preferably closed by a suitable bushing 65, the lower end of which is adapted to bear against the upper end of the spring 63. This bushing is preferably provided with vertical slot 66 extending the depth of the bushing. The plunger 60 is provided, also, with a retaining pin 68 which is adapted to coöperate with the slot 66 when it is desired to retract the end 59 of the plunger from engagement with the lamp-connecting rod 45. To facilitate the movement of the plunger, the upper end thereof may be provided with a suitable handle 67, whereby the plunger may be lifted until its pin 68 is drawn through the vertical slot 66 of the bushing and turned into register with and seated within a depression thereof, whereupon the movement of the reach rod 22 will permit the head 56 of the vertical coöperating rod to slide loosely upon the lamp-connecting rod 45 without affecting the movement of the lamps.

Should it be desired to have the lamps move in unison with the movement of the steering wheels of the vehicle, the operator, or driver, merely rotates the plunger 60 by means of the handle 67 until its pin 68 registers with the slot 66, whereupon the end 59 of the plunger will come into engagement with a notch 58 in the connecting rod. As the connecting rod is connected to the lamps by the arms 44 carried by the movable member 28 of each lamp bracket, it is obvious that any movement of the reach rod and corresponding movement of the lamp-connecting rod 45 will cause the lamp bracket and its lamp to be moved in unison with the guiding movements of the wheels.

In Fig. 14, there is disclosed a modified form of the vertical compensating rod wherein the upper section 50 is connected to the lower section 53 thereof by a plurality of pivotally connected arms 70. Said arms are shown in the drawings as being annularly arranged with relation to each other, whereby they will permit of vertical movement of member 50 with reference to member 53, and at the same time transmit lateral movement through said vertical compensating rod from the reach rod 22 to the lamp-connecting rod 45.

It will be obvious that the details of construction may be varied as may be rendered necessary by different conditions of use, and that the invention, therefore, is not restricted to the precise details shown and described herein.

Having thus fully described my invention, what I claim as new and desire to secure by Letters Patent is:—

1. In a lamp-shifting mechanism for automobiles, lamp brackets, a reach rod, a lamp-connecting rod, a compensating rod comprising upper and lower members having means of connection which prevent rotation of one member with relation to the other member, said compensating rod connecting the reach rod with said lamp-connecting rod, and a spring-actuated plunger carried by said compensating rod and adapted to engage the lamp-connecting rod to control the action of the lamp bracket.

2. In a lamp-shifting mechanism for automobiles, lamp brackets, a reach rod, a lamp-connecting rod, an extensible compensating rod connecting the reach rod with said lamp-connecting rod, and a catch device carried by the compensating rod and slidably mounted on the connecting rod, said catch device comprising a casing, a spring-actuated plunger carried thereby, and means for retaining said plunger in and out of engagement with said connecting rod.

3. In a lamp-shifting mechanism for automobiles, a lamp connecting rod, a compensating rod, a catch device mounted on the compensating rod to connect said rod to the lamp-connecting rod, said catch device comprising a casing, a spring-actuated plunger carried thereby, a bushing surrounding the plunger, and a stop pin carried by the plunger to coöperate with the bushing for retaining the catch device in its engaged or disengaged positions.

In testimony whereof, I affix my signature, in presence of two witnesses.

JAMES H. CLARK.

Witnesses:
C. B. RUSSELL,
ALICE D. RUSSELL.

Copies of this patent may be obtained for five cents each, by addressing the "Commissioner of Patents, Washington, D. C."